United States Patent [19]

Bhaumik et al.

[11] 4,063,192
[45] Dec. 13, 1977

[54] KRYPTON FLUORIDE EXCIMER LASER UTILIZING NITROGEN TRIFLUORIDE AS A FLUORINE DONOR

[75] Inventors: Mani Lal Bhaumik, Malibu; Robert Spencer Bradford, Jr., Los Angeles; Earl Rema Ault, Rolling Hills Estates; Philip Clyde Stevens, Redondo Beach, all of Calif.

[73] Assignee: Northrop Corporation, Los Angeles, Calif.

[21] Appl. No.: 693,709

[22] Filed: June 7, 1976

[51] Int. Cl.² .................................................. H01S 3/00
[52] U.S. Cl. .............................................. 331/94.5 G
[58] Field of Search .................................... 331/94.5 G

[56] References Cited
PUBLICATIONS

Bhaumik et al., *Appl. Phys. Lettr.*, 28, No. 1, Jan. 1, 1976, pp. 23-24.

*Primary Examiner*—Martin H. Edlow
*Attorney, Agent, or Firm*—Edward A. Sokolski

[57] ABSTRACT

A laser using an electron beam pump mixture of argon, krypton and nitrogen trifluoride. High power krypton fluoride laser emission is efficiently generated by employing nitrogen trifluoride as a fluorine donor.

5 Claims, 1 Drawing Figure

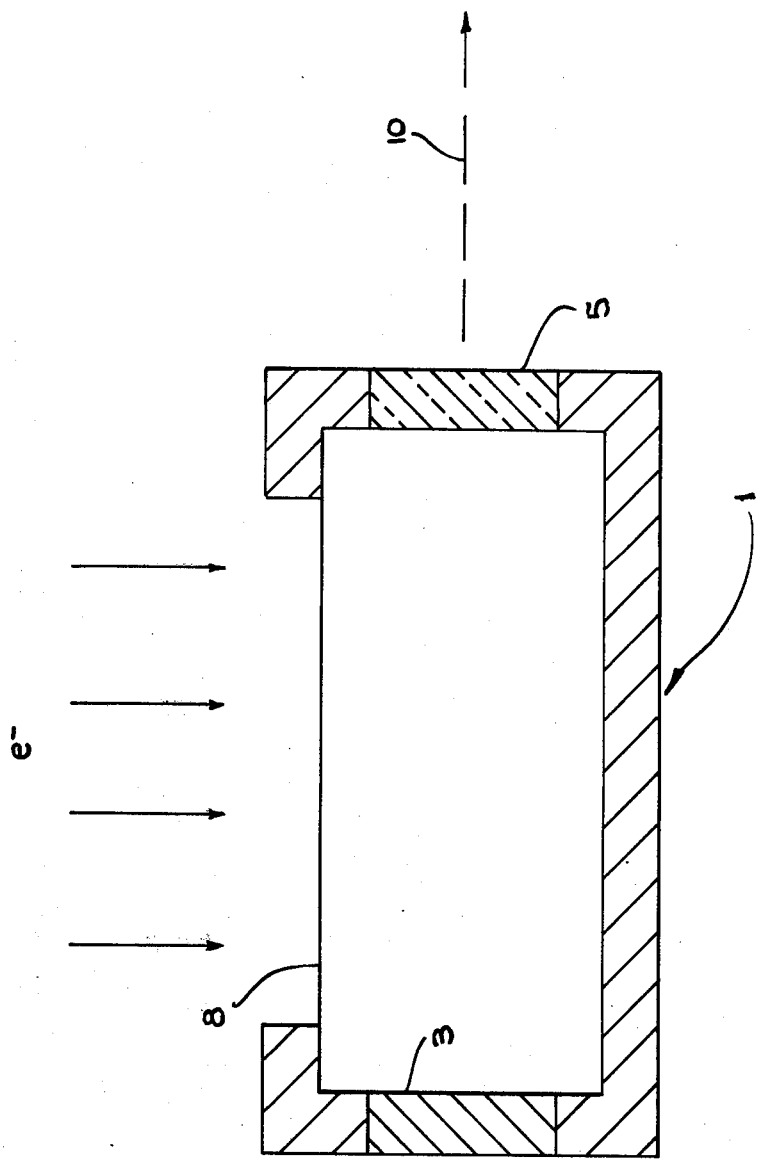

KRYPTON FLUORIDE EXCIMER LASER UTILIZING NITROGEN TRIFLUORIDE AS A FLUORINE DONOR

The Government has rights in this invention pursuant to Contract No. N00014-72-C-0456 awarded by the United States Navy.

This invention relates to gas lasers, and more particularly to such a laser employing krypton fluoride as the active laser molecule with nitrogen trifluoride being employed as a fluorine donor.

The use of a krypton fluoride excimer as a laser molecule, in view of the fact that it employs a bound-free transition, offers advantages of improved efficiency over lasers using gases employing bound-bound transitions such as argon-nitrogen and xenon fluoride when the saturation intensity limits the rate of stimulated emission. With a bound-free transition, a larger rate of stimulated emission is possible for successful competition against non-radioactive losses. This is because the dissociation of the gas molecules in the ground state makes for significantly less attenuation to the photons emitted than where the molecules remain bound.

While the use of krypton fluoride as a laser gas has been suggested in the prior art, this has in the prior art required a mixture of Ar, Kr and $F_2$. It has been found that the use of $F_2$ as a donor has several shortcomings. First, $F_2$ is highly corrosive and tends to attack the walls of the gas chamber causing rapid fluorine degradation. Further, $F_2$ tends to absorb at the laser emission wavelength, thus cutting down the output of the laser. The present invention overcomes the aforementioned shortcomings by utilizing $NF_3$ as a fluorine donor in a KrF laser, rather than $F_2$. $NF_3$ is substantially less corrosive than $F_2$ and does not abosrb at the laser emission wavelength. Further, it has been found that the laser mixture containing $NF_3$ is reusable for a substantially greater number of shots than the mixture containing $F_2$ (30 shots as compared with 5).

The sole FIGURE of the drawings schematically illustrates the device of the invention.

Briefly described, our invention is as follows: A mixture of Ar, Kr and $NF_3$ is fed to a laser gas chamber and pumped with an electron beam. A laser oscillator cavity, the optical axis of which passes through the chamber, is formed by means of oppositely positioned reflectors, krypton fluoride laser emission being generated within this cavity.

Referring now to the sole FIGURE, a laser gas chamber 1, has internal reflecting mirrors 3 and 5 at the opposite ends thereof, and a thin metal foil 8 forming one of the side walls thereof. Foil 8 may be of titanium of the order of 3 mils in thickness. Mirror 5 is partially reflective and with total reflector 3 forms a laser oscillator cavity. Chamber 1 contains a gas mixture of Ar, Xe and $NF_3$. A suitable electron gun, ($e^-$) is used to pump the gas mixture in chamber 1. A laser output beam 10 is generated by virtue of the population inversion in the gas stimulated by the pumping action and the oscillation of the beam in the oscillator cavity. The gun may be a commmerically available Physics International Model Pulserad No. 110A, having a 1MeV, 20kA, 20nsec pulse output. Using this $e$ beam pumping, optimum high power KrF laser emission has been obtained at 249nm from an Ar, Kr and $NF_3$ mixture in the ratio of 1300:130:1 at total pressures of 2-3.5 atmospheres. Using the above described $e$ beam pumping with this mixture, a peak laser power of 10 MW was obtained for 10nsec.

The laser mixture was found to be reusable for as many as 30 shots.

Acceptable results can be achieved (using the above indicated $e$ beam pumping) with the laser mixture within the following ranges of proportions: Ar, 1300: Kr, 65-260: and $NF_3$, 0.5-2 parts by volume at total pressures of 2-3.5 atmospheres.

While the invention has been described and illustrated in detail, it is to be clearly understood that this is intended by way of illustration and example only and is not to be taken by way of limitation, the spirit and scope of this invention being limited only by the terms of the following claims.

We claim:
1. A KrF laser comprising:
   a gas chamber,
   a pair of reflectors, one of which is only partially reflective, positioned opposite each other to define a laser ocsillator cavity which passes through the chamber,
   a gas mixture comprising Ar, Kr and $NF_3$ being fed to said chamber, and
   laser pump means for exciting the gas mixture, the $NF_3$ operating as a fluorine donor to the Kr to form KrF, the pump means effecting a population inversion in the KrF whereby KrF laser emission passes through said partial reflector.

2. The laser of claim 1 wherein said gas mixture comprises Ar, 1300: Kr, 65-260: $NF_3$, 0.5-2 parts by volume.

3. The laser of claim 1 wherein said gas mixture comprises Ar, 1300: Kr, 130: $NF_3$, 1 parts by volume at a total pressure of 2-3.5 atmospheres.

4. The laser of claim 1 wherein said pump means comprises an electron gun having a pulsed $e$ beam output.

5. The laser of claim 3 wherein said pump means comprises an electron gun having a pulsed $e$ beam output.

* * * * *